Feb. 21, 1961 E. D. CONKLIN ET AL 2,972,230
AUTOMOBILE GAS TURBINE
Filed Jan. 13, 1954 7 Sheets-Sheet 1

Inventors
James M. Ricketts,
Emmett D. Conklin,
Eugene E. Flanigan &
William A. Turunen
BY Paul Fitzpatrick
Attorney Feb. 21, 1961  E. D. CONKLIN ET AL  2,972,230
AUTOMOBILE GAS TURBINE Filed Jan. 13, 1954  7 Sheets-Sheet 7

Inventors
James M. Ricketts,
Emmett D. Conklin,
Eugene E. Hanigan Jr.
William A. Turunen
BY Paul Fitzpatrick
Attorney United States Patent Office 2,972,230
Patented Feb. 21, 1961

2,972,230

AUTOMOBILE GAS TURBINE

Emmett D. Conklin, Milford, Eugene E. Flanigan, Detroit, James M. Ricketts, Oxford, and William A. Turunen, Birmingham, Mich., assignors to General Motors Corporation, Detroit, Mich., a corporation of Delaware Filed Jan. 13, 1954, Ser. No. 403,824

2 Claims. (Cl. 60—39.31)

This invention relates to automobile propulsion and to a power plant of the gas turbine type. The principal object of the invention is to provide a superior gas turbine power plant installation particularly suitable for automobiles.

More specifically, objects of the invention are to provide a compact gas turbine engine and to provide a gas turbine assembly and supporting structure therefor. A further object of the invention is to provide a novel and improved arrangement of compressor and combustion chamber in a gas turbine.

The preferred embodiment of the invention is in a gas turbine engine comprising a centrifugal compressor, combustion chambers supplied thereby, a first turbine powered by combustion products from the combustion chambers and coupled to the compressor, and a second turbine driving a power output shaft which is coupled through suitable power transmission gearing to the drive wheels of the car. The nature and advantages of the novel structures according to the invention will be more clearly apparent from the succeeding detailed description and the accompanying drawings, in which:

Figs. 3, 4, 5, and 6 taken together constitute a sectional view of the engine.

Figure 1:
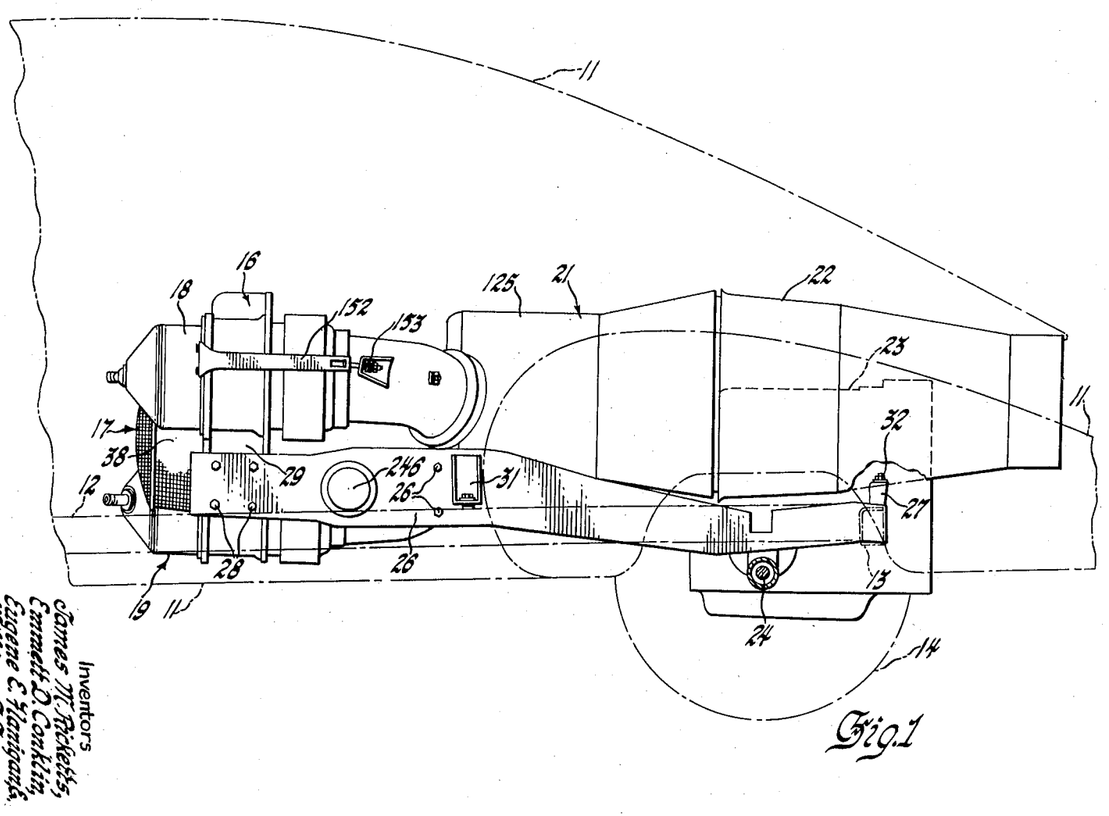
Fig. 1 is an elevation view of an automobile turbine installation, the outline of the automobile being indicated by broken lines.
Figure 2:
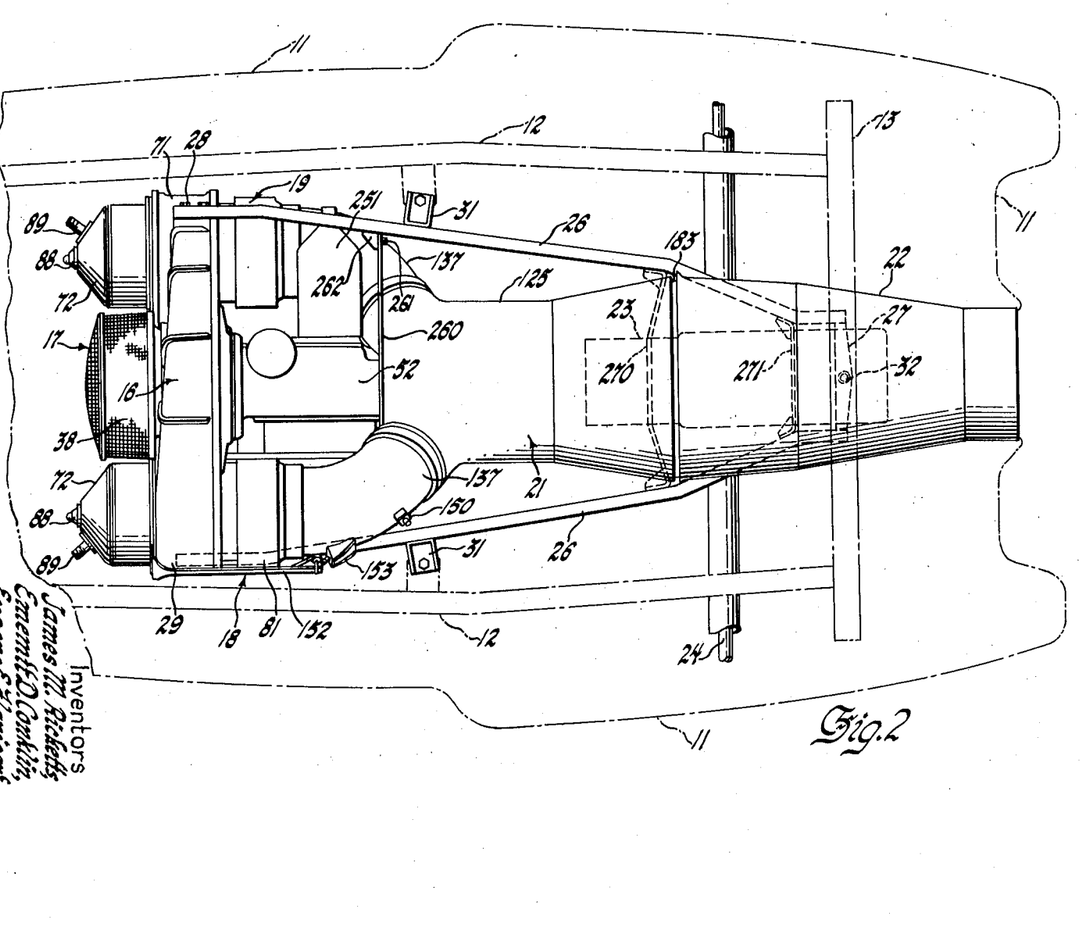
Fig. 2 is a plan view of the same.

Referring first to Figs. 1 and 2, these illustrate the installation of an engine according to the invention at the rear end of an automobile, the body of which is immaterial and may be considered as indicated in outline by the broken lines 11. The car includes longitudinal frame members 12 and a rear frame cross member 13. The frame may be conventional. The rear wheels are indicated at 14. The rear suspension and drive are of a de Dion type, the details of which are immaterial to this invention but for which reference may be made to the copending applications of Robert Schilling for Vehicle Suspension S.N. 401,541, filed December 31, 1953 (Patent 2,890,895), and Maurice A. Thorne for Final Drive Mechanism S.N. 401,535, filed December 31, 1953 (Patent 2,857,975).

The engine, transmission, and differential gear constitute an assembly which may be mounted in the vehicle as a unit and which comprises, in general terms, a radial-flow compressor 16 receiving air through an inlet 17 and discharging it into combustion chambers 18 and 19 from which it flows through turbine wheels mounted within a casing 21. The exhaust gases are discharged through a pipe 22 to the rear end of the vehicle. This pipe is of saddle shaped contour at the forward end and overlies a transmission 23 which includes speed reduction and reverse gears and a differential gear through which the half shafts 24 of the rear wheels 14 are driven. The compressor, combustion chambers, turbine, transmission, and exhaust pipe are mounted on a subframe which comprises a rail 26 at each side of the power plant and a cross member 27 at the rear. The front ends of the rails 26 are bolted at 28 to the outer case or air collector scroll 29 of the compressor. The entire power plant assembly is supported on the chassis frame 12, 13 of the vehicle at three points. Brackets 31 extending from the rails 26 are mounted by conventional shock absorbing supports on pads on the frame. The rear cross member 27 is mounted by bolt 32 and a shock absorbing mount to a pad on the rear frame cross member 13. By virtue of the three point mounting of the power plant and the de Dion type rear axle, the power plant is easily installed and removed and is not affected by distortions of the chassis or movements of the rear wheels.

The details of the power plant will be clearer after general discussion of the engine structure. Referring additionally to Figs. 3 to 6, it will be seen that the compressor case 29 defines not only the collector chamber or scroll 33 but also the forward cover of the compressor and the air inlet portion 34 which is coupled by a V band clamp 36 to a flaring air entrance duct 37 on the front of which is mounted a screen 38. An engine oil cooling radiator 39 is mounted in the path of air entering the engine. The compressor case is completed by a back plate 40 bolted to the front plate 29 by studs and nuts 41.

Figure 4:
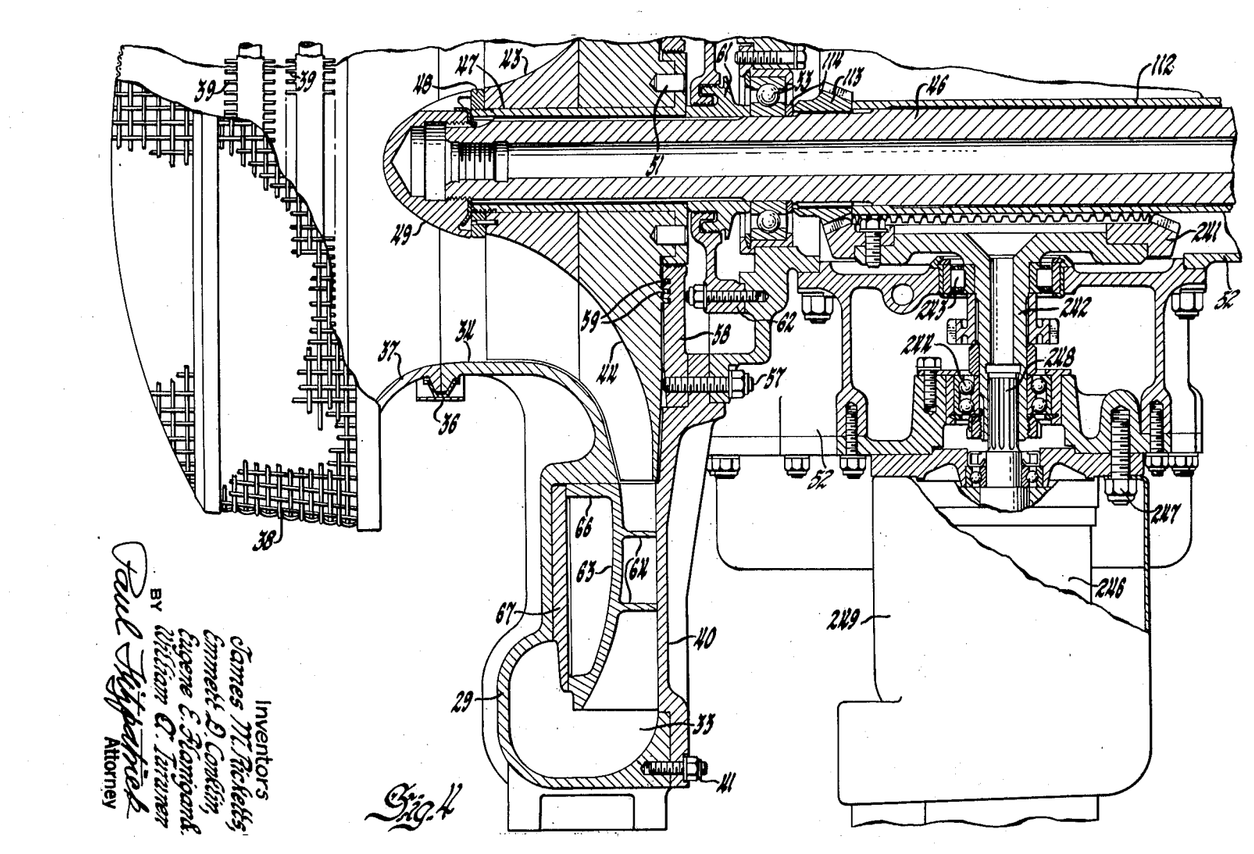
Fig. 4 is a sectional view taken on a plane containing the axis of the engine showing principally the air intake, compressor, and auxiliary drive gearing.

A centrifugal compressor rotor 42, which may be of known type comprising an inducer or entry portion 43 and an impeller or discharge portion 44, is mounted on the main shaft 46 for rotation therewith. The parts 43 and 44 are assembled on an internally splined sleeve 47 and held thereon by nut 48. The sleeve is held on the end of shaft 46 by a streamlined nut 49. The impeller 44 is non-rotatably mounted on the sleeve 47 by pins 51. Shaft 46 is supported in an engine frame or drive shaft housing 52, extending between the compressor and turbine, by a forward ball bearing 53 and a rear roller bearing 54, the latter being adjacent the first turbine wheel 55 which drives the compressor rotor through shaft 46. The housing or frame 52 is fixed to the compressor case rear plate 40 by studs 56 and 57. Studs 57 are mounted in an annularly grooved seal plate 58 which lies closely adjacent the rear surface of the rotor which is formed with ridges 59 rotating in the grooves of the plate 58. Plate 58 also is grooved in its internal opening to form a labyrinth seal with the flange of sleeve 47. Studs 57 extend from seal plate 58 through plate 40 and the flange of housing 52, and are secured by nuts. Additional labyrinth seals forwardly of the bearing 53 are defined by a ring 61 on shaft 46 and a member 62 fixed to the forward face of housing 52.

Figure 7:
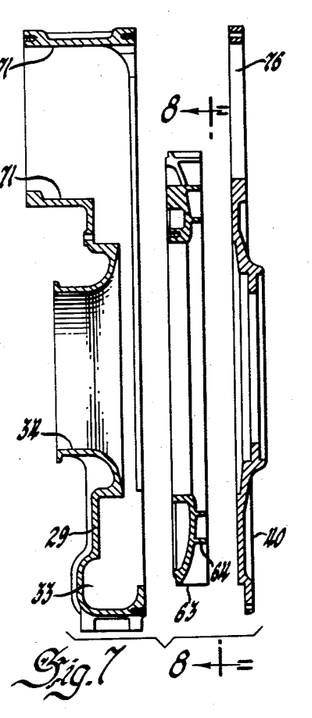
Fig. 7 is an exploded view of the compressor case and diffuser.
Figure 8:
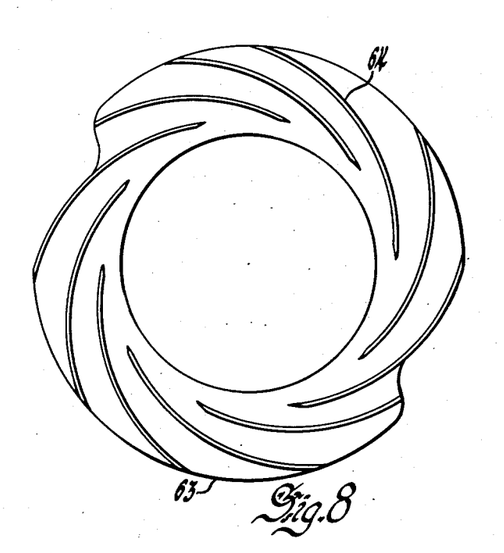
Fig. 8 is an elevation view of the diffuser taken on the plane indicated in Fig. 7.

Air discharged from the compressor rotor 42 flows into a diffuser 63, shown also in Figs. 7 and 8, which comprises a unitary member defining a plate curving away from the back plate 40 toward the outer margin and spiral ribs 64 thereon which act as guide vanes for the discharged air. The plate 63 has a flange 66 at the inner edge which is piloted on the case 29. A disk or annular plate 67 is fixed to the forward face of the diffuser 63 by screws 68 and this entire assembly is held on the case 29 by bolts 69.

Figure 3:
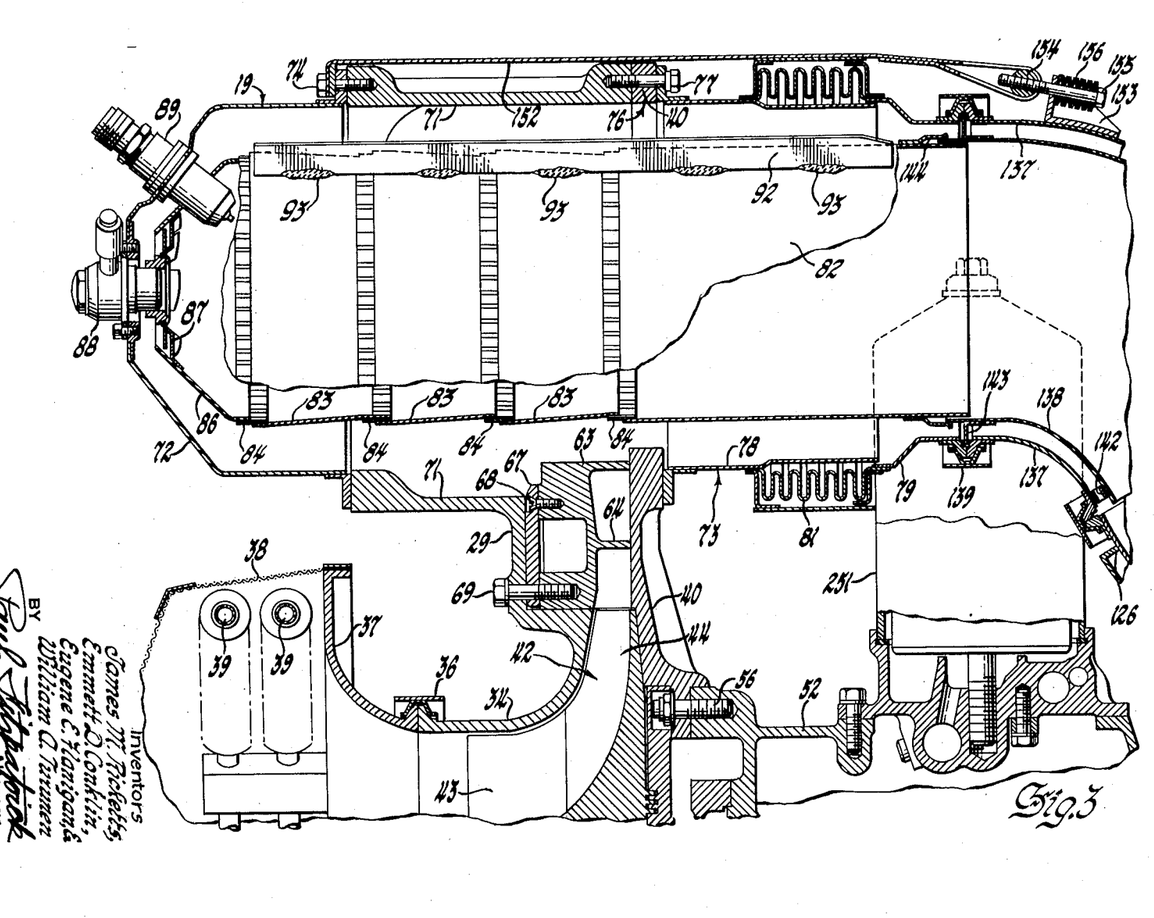
Fig. 3 is a sectional view taken on a plane containing the axis of the engine, showing principally the combustion chamber.

The air collector scroll comprises two circumferentially enlarging portions of approximately 180° extent, each of which discharges into one of the combustion chambers 18 and 19. The compressor case is formed at points 180° apart with cylindrical portions 71, the axes of which are parallel to the compressor axis. These cylindrical portions 71 define the intermediate part of the two combustion chambers, each of which also comprises a forward shell 72 and a rear shell 73 aligned with the cylinder 71. The forward shell 72 is integral with a flange secured to the forward face of the cylinder 71 by bolts 74. The compressor rear plate 40 is also formed with two circular openings 76 which register with the cylindrical portions 71. A flange on the rear shell 73 is fixed to the case 29 by bolts 77 passing through the rear plate 40 into the cylindrical portion 71, which constitute part of the means by which the compressor casing parts 29 and 40 are held together.

The rear combustion chamber shell 73 comprises two generally cylindrical parts 78 and 79 connected by a bellows type expansion joint 81 of known type to provide for thermal expansion. Combustion takes place within the combustion chamber 18 in a flame tube or combustion liner 82 which is comprised of a number of sections 83 united by corrugated strips 84 welded to the sections and a forward cap or dome 86. The parts 82 and 83 may, of course, be provided with openings for admission of air in a suitable pattern, which are not illustrated. Air also enters the forward end of dome 86 through a swirler 87 which may be such as that shown in the application of John R. Hayes, Serial No. 209,265, for Combustion Chamber with Swirler, filed February 3, 1951 (Patent 2,768,497). A fuel nozzle 88, the internal structure of which is immaterial to the invention, is bolted to the forward end of shell 72 and piloted within the swirler 87, providing a support for the forward end of the flame tube.

An igniter or spark plug 89, which may be of known type and the structure of which is also immaterial to the invention, is mounted in the shell 72 and extends through the dome 86.

As appears most clearly in Fig. 2, each half of the collector scroll portion of the compressor case 29 increases in width circumferentially of the engine and it also increases slightly in its radial dimension circumferentially of the engine so as to increase in cross section toward each of the combustion chambers into which it discharges. The cylindrical portion 71 which constitutes a part of the combustion chamber also constitutes a termination of the particular half circumference of the collector. The extreme distance of this portion from the axis of the engine is but very slightly greater than the radius of the beginning portion from the axis as will be apparent from the slight amount to which the parts 71 project outside the forward end of the frame rails 26.

By mounting the combustion chamber into the diffuser as is done in this engine instead of completing the diffusion of the air and then turning the air into an outlet which discharges it into the combustion chamber, a far more compact structure than that of conventional engines is achieved. In other words, the necessary diameter of the compressor diffuser and collector substantially determines the diameter of the engine. As will be apparent from Fig. 8, the diffuser plate 63 is slightly notched at the margin to provide clearance for the combustion chamber liner so that the liner is as close to the axis of the engine as is consistent with proper diffusion and discharge of air.

The discharge of air into the mid-portion of the combustion chamber allows the combustion chamber to project forwardly to approximately the same plane as the air inlet and brings the turbine close to the compressor, making possible a short rigid one-piece main shaft 46, which is another important advantage of the construction according to the invention. The length of shaft 46 is no more than is needed for installation of accessory drives, lubricating oil sump, and the like between the turbine and compressor.

With the compressor-diffuser-combustion chamber arrangement of the invention, some difficulty was experienced with combustion which was found to be the result of swirl of air circumferentially around the combustion chamber liner which interfered with proper flow patterns through the combustion chamber liner. This problem was solved by providing a baffle extending longitudinally of the liner and substantially from the wall of the flame tube to the wall of the combustion chamber. This baffle constitutes a strip 92 of sheet metal welded as indicated at 93 to each of the sections of the combustion chamber. The preferred position for this strip is approximately at the middle of the leeward side of the liner with respect to the position of the air inlet to the combustion chamber. However, in the view of Fig. 3, it is shown rotated some 45° above this position so as to show more clearly. With the baffle thus mounted, the air entering the combustion chamber divides and flows around each side of the liner and toward each end of the liner and the flow into the liner is quite satisfactory.

Figure 5:
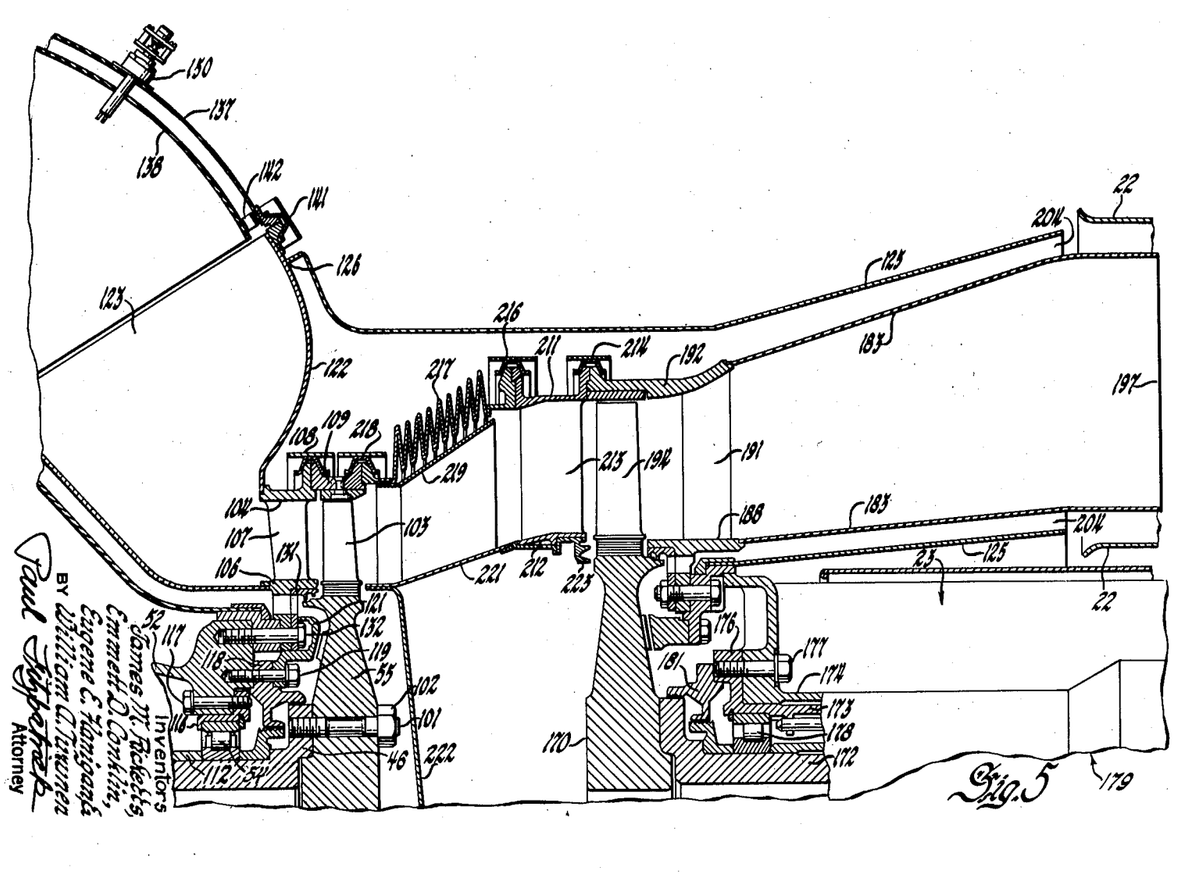
Fig. 5 is a similar sectonal view showing the combuston chamber outlet and turbines above the axis of the engine.

As previously stated, the first turbine wheel 55 is mounted on shaft 46 which is rotatably supported in bearings 54 and 53 in the housing 52. Turbine wheel 55 is piloted within a flange on the end of shaft 46 and held thereon by studs 101 and nuts 102. Blades 103 are mounted in a conventional manner on the rim of wheel 55 to receive the combustion products from a nozzle diaphragm defined by an outer shroud 104, an inner shroud 106, and blades 107 extending between the shrouds. The outer shroud is connected by a V band clamp 108 to the turbine wheel case or shroud 109.

A labyrinth seal ring 111 is mounted between the flange at the end of shaft 46 and the inner race of bearing 54. A sleeve 112 extends from bearing 54 to an accessories drive gear 113 which abuts a washer 114 engaging the inner race of bearing 53. These parts and seal ring 61 and compressor rotor 42 stack up on shaft 46 between the end flange and the nut 49. The outer race of bearing 54 is held in a cage 116 held by bolts 117 to the casing 52. A seal collar 118 which defines labyrinth seals with the rings 111 and the shaft 46 is fixed to the casing 52 by bolts 119. Bolts 119 also retain an annular shroud 121 which lies in front of the outer portion of turbine wheel 55.

The turbine inlet casing or scroll 122 is welded to the shrouds of the turbine nozzle and defines two openings 123 at opposite sides of the axis to receive the combustion products. The scroll 122 is mounted within the forward end of an outer turbine case or heat shield 125 which has flanged openings 126 abutting the entrance portions 123 of the scroll. The heat shield 125 pilots in a mounting ring 127 which is secured by bolts and nuts 128 to a flange 129 extending inwardly from the inner shroud 106 of the turbine nozzle. The mounting ring 127, the flange 129, and a labyrinth seal ring 131 are fixed to the case 52 by bolts 132. Seal ring 131 cooperates with a flange on the rim of the turbine wheel 55.

Air is circulated over the forward face of the turbine wheel and into the casing 125 by centrifugal fan blades 133 on the face of the turbine wheel which draw air through passages 134 extending through the rear flange of the case 52 and through ring 121 and blow it outwardly between the ring 121 and the turbine wheel and discharge it through holes 136 in the parts 129 and 131. The air thus discharged circulates around the turbine inlet case 122 and rearwardly through the outer casing 125, as will be described.

Combustion products are conducted from the combustion chamber into the inlets 123 to the turbine through concentric inner and outer ducts or elbows 137 and 138. The outer conduit 137 is provided with flanges which are secured to the part 79 of the combustion chamber by a V band clamp 139, and similarly to the turbine inlet 123 by clamp 141. The liner 138 is spaced from the outer conduit 137 at its discharge end by sheet metal spacers 142 and at its forward end by a flange 143 on the elbow which extends into a recess between the flanges on the parts 79 and 137 for location. The rear end of the combustion liner 82 is telescoped within the forward end of the discharge elbow 138 and is provided with a flange 144 which engages the outer surface of the elbow to align the two parts. It will be apparent that this sliding joint provides for relative expansion of the parts.

Combustion chamber temperature is measured by a thermocouple 150 mounted in any suitable manner in the elbow 137 and projecting through an opening in the liner 138. The structure of the thermocouple and the details of the mounting are immaterial to the present invention.

The outer wall of the combustion chamber is not constituted to resist the pressure exerted against the ends by the air within the chamber because of the thermal expansion joint 81. This pressure, therefore, tends to distort the turbine nozzle because the combustion chambers exert forces of considerable magnitude along an axis outboard of the nozzle. These forces are compensated for in large measure while retaining the ability of the combustion chamber to adjust to thermal conditions by an arrangement comprising a strap 152 fixed by bolts 74 to the forward end of the portion 71 of the compressor case and coupled to a bracket 153 welded to the elbow 137. The rear end of the strap is looped around a rod 154 through which a bolt 155 is threaded. A stack 156 of Belleville washers is compressed between the head of the bolt 155 and the flange of the bracket so as to pull on the strap 152. The expansion of the combustion chambers can be accommodated by compression of springs 156 and, if desired, these springs may have a very low rate so that the tension varies little with the movement.

The major structures of the gas generator turbine have been described and the operation will be obvious to those skilled in the art. This gas generator turbine delivers combustion products at reduced temperature and pressure to the second or power output turbine which drives the vehicle, the gas generator turbine running at all times and the power output of the second turbine being varied by increasing or decreasing the fuel supply to the gas generator and thus increasing or decreasing the pressure and temperature of the motive fluid supplied to the power turbine.

Figure 6:
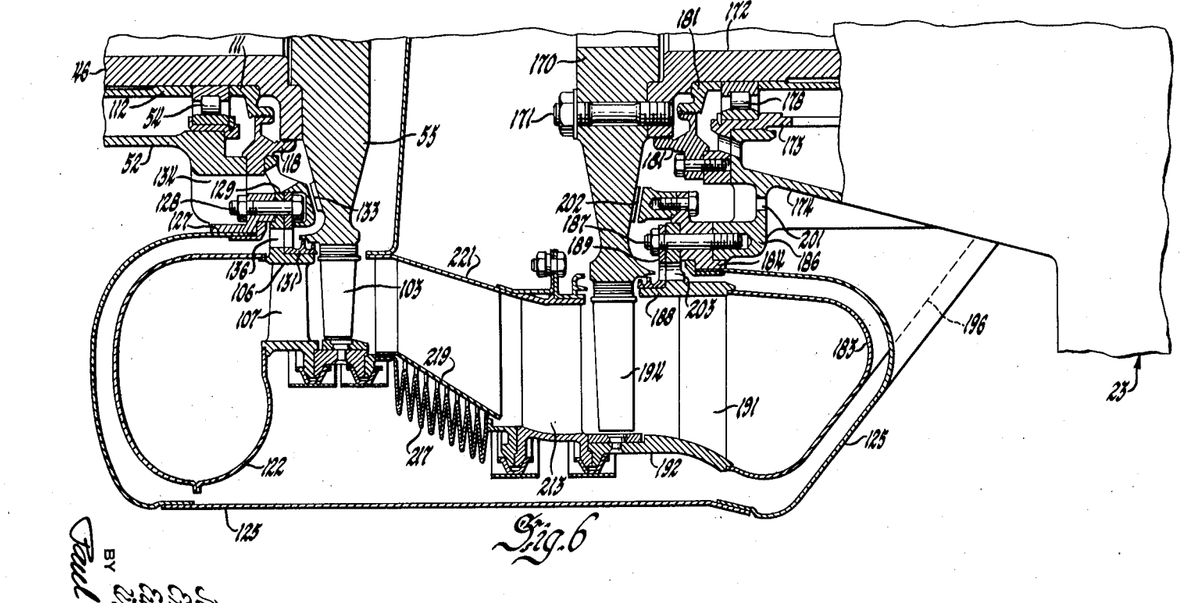
Fig. 6 is a sectional view similar to Fig. 5 below the engine axis.

Considering now the power turbine structure, the power turbine comprises a wheel 170 coaxial with and spaced from the turbine wheel 55. Turbine wheel 170 is mounted by studs and nuts 171 on a flange of a power output shaft 172 into which the wheel is piloted for alignment. This shaft is supported in the power transmission 23 which is preferably that disclosed in the copending application of Oliver K. Kelley for Plural Step Transmission Serial No. 402,483, filed January 6, 1954 (Patent 2,884,813). The transmission provides speed reduction and reversing gears and drives the half shafts to the wheels through differential gear mechanism. The internal structure of the transmission is not material to the present invention but it is significant that the transmission is mounted on the engine subframe and provides a support for the power turbine which is essentially independent in this respect of the gas generator turbine. The shaft 172 of turbine 179 is supported in a sleeve 173 which is a slip fit in a housing 174 in the transmission case. This sleeve is formed with a flange 176 retained by bolts 177 to hold the turbine wheel and shaft in place on the transmission. The shaft 172 rotates in a roller bearing 178 mounted in the sleeve 174 and an additional bearing (not shown). Labyrinth seal structures 181 and 182, similar to those for the first turbine wheel, are provided. The outer turbine case 125 extends past the second turbine wheel and around the exhaust collector casing 183, and terminates in a flange or ring 184 which is secured to a mounting flange 186 of the transmission case 174 by studs 187. These studs also pass through an inwardly directed flange of an inner exhaust shroud 188 and serve to mount a labyrinth seal ring 189 cooperating with the rim of the turbine wheel. Struts 191 extend from the inner shroud 188 to an outer exhaust shroud 192, these annular shrouds receiving the gas discharged through the blades 194 of the turbine wheel 170. The turbine exhaust collector 183 is welded to the shrouds 188 and 192. This collector is closed below the center line of the turbine by upwardly extending walls 196 which direct the gas to the discharge opening 197 which is of the form of half of an annulus overlying and straddling the transmission. The exhaust collector 183 except for the outlet is enclosed within the outer case 125.

The rear turbine disk is cooled similarly to the forward turbine by air drawn in through holes 201 in the flange 186 of the transmission and driven outwardly by fan blades 202 on the face of the disk to a discharge through holes 203 in the flange of inner exhaust shroud 188 and seal ring 189. This air circulates through the space between the exhaust collector 183 and the outer case 125 and is discharged along with the air pumped by the forward turbine wheel through the space 204 defined between the rear end of the case 125 and the exhaust duct 183. It will be noted that the outer casing 125 completely surrounds the turbine and hot motive fluid ducts and acts as a heat shield between these and the structure of the vehicle as well as between these and the transmission.

Considering now the structure between the first and second turbine wheels, it will be remembered that the outer shroud 192 of the power turbine is supported by struts or blades 191 from the inner shroud which is mounted on the transmission. The power turbine nozzle diaphragm comprises an outer shroud 211 and an inner shroud 212 supported therefrom by blades 213. The outer shroud is fixed to the turbine shroud ring 192 by a V band clamp 214 and is coupled by V band clamp 216 to a bellows type flexible duct 217, the other end of which is coupled to the first turbine shroud by V band clamp 218. It will be noted that all of these clamped joints are of conventional type, including flanges or rings having pilots for radial alignment. The flexible duct 217 is lined by a conical smooth-walled duct 219 welded to the forward end of the flexible duct and discharging into the second turbine nozzle. The inner wall of the motive fluid duct is defined by a conical sheet metal ring 221 fixed on the inner nozzle diaphragm 212. A disk 222 fixed on the ring 221 closes the space between the second turbine disks.

It will be apparent that relative expansion of the two structures can be accommodated by yielding of the bellows 217 and by relative movement of the inner structure 221, 222 with respect to the first turbine wheel. A labyrinth seal ring 223 is bolted to the inner shroud of the power turbine nozzle. As will be apparent, the motive fluid discharged from the first turbine is directed by nozzle vanes 213 onto blades 194 of the power turbine wheel to exert torque which drives the car through the transmission 23.

Bearing 178 is lubricated from the transmission. The arrangements for lubricating the gas generator bearings are not described, as is the customary practice. For coupling the shaft 46 to accessories such as a starter, generator, oil and fuel pumps, and a tachometer, the bevel gear 113 on the shaft drives a bevel gear 241 mounted on a flange of shaft 242 supported in bearings 243 and 244 in the shaft housing 52. A combined engine starter and generator 246 is secured by bolts 247 to the engine housing and has its shaft 248 splined to the shaft 242. A sheet metal heat shield tube 249 lies over the starter generator to protect it from heat radiated from the combustion chamber 18. The oil and fuel pumps may be driven from the gear 241 by mechanism not shown.

An oil filter 251 is mounted on the engine case 52, the nature of the filter and its connections into the lubrication system being immaterial to the present invention.

The exhaust duct or tail pipe 22 (Figs. 1, 2, and 5) has a front end fitting around the engine outlet 197 with substantial clearance so that the exhaust gases discharged from the outlet 197 proceed through the tail pipe to the rear end of the vehicle and aspirate additional air into the tail pipe through the clearance. The inlet of the tail pipe is closely adjacent the discharge point 204 of the turbine cooling air so that this is aspirated into the tail pipe. The tail pipe is supported on the side rails 26 independently of the rest of the engine.

It has previously been pointed out that the gas generator turbine and the power turbine are separately supported on the frame rails 26 and are interconnected by a flexible structure which allows for thermal expansion or distortion.

The principal support of the gas generator is the bolting of the compressor case 29 to the front end of the rails at 28 as shown in Fig. 1. In addition, a relatively thin deep plate 260 extends between the rails over the outlet of combustion chamber 19 and under the outlet of combustion chamber 18. This plate is fixed to the rear end of the accessory gear case 52 immediately ahead of the turbine. The plate 260 is fixed to the side rails by bolts 261 (Fig. 2) through angle brackets 262. The plate is rigid in a vertical direction but flexible fore and aft so that it can bow slightly to accommodate expansion due to heat.

The transmission 23 is supported by plates 270 and 271 which are similar to the plate 260 and extend from one rail to the other. The plate 271 is sufficiently stiff to resist any fore and aft movement of the transmission, while the plate 270 is relatively flexible in the fore and aft direction. Both of these plates are of deep enough section to resist any vertical movement of the transmission, or rotation thereof about a longitudinal axis. It will be seen, therefore, that all the parts of the power plant are supported on the subframe in a simple and efficient manner providing for relative movement as necessary and preventing any undesired movement of the parts.

The entire installation is particularly suited for automobile purposes because of the power characteristics of the gas coupled turbine and because of the compactness and ease of installation of the power plant.

The detailed description herein of the preferred embodiment of the invention is not to be construed as limiting the scope of the invention.

Our divisional application Serial No. 789,705 for Gas Turbine filed January 28, 1959 is directed to a portion of the subject matter disclosed herein.

We claim:

1. A gas turbine power plant comprising, in combination, a frame including side rails extending side by side in spaced relation longitudinally of the power plant; a radial-flow compressor comprising a diffuser case mounted between and fixed to the side rails adjacent one end thereof, the diffuser case having two outlet portions substantially diametrically spaced, one outlet portion overlying one side rail, and the other outlet portion underlying the other side rail; a gas generator turbine structurally connected rigidly to the compressor and drivingly coupled thereto; two combustion chambers extending substantially parallel to the side rails from the said outlet portions to the said turbine, the combustion chambers respectively overlying and underlying the respective side rails; a power turbine coaxial with the gas generator turbine; a power transmission fixed to and supporting the power turbine, the power transmission being mounted on the frame adjacent the end of the frame opposite to the compressor; and a flexible annular combustion products duct connecting the two turbines accommodating expansion and misalignment of the turbines.

2. A power plant as recited in claim 1 in which the diffuser case is rigidly connected to the side rails and provides the structural connection between the end of the side rails at which the diffuser case is mounted.

References Cited in the file of this patent

UNITED STATES PATENTS

| | | |
|---|---|---|
| 2,443,054 | Putz et al. | June 8, 1948 |
| 2,459,079 | Johnson et al. | Jan. 11, 1949 |
| 2,481,547 | Walker et al. | Sept. 13, 1949 |
| 2,579,614 | Ray | Dec. 25, 1951 |
| 2,589,239 | Fallon | Mar. 18, 1952 |
| 2,620,624 | Wislicenus | Dec. 9, 1952 |
| 2,637,975 | Hague | May 12, 1953 |
| 2,640,317 | Fentress | June 2, 1953 |
| 2,644,302 | Kidd | July 7, 1953 |
| 2,660,033 | Bowden | Nov. 24, 1953 |
| 2,661,593 | Hughes et al. | Dec. 8, 1953 |
| 2,663,141 | Hage | Dec. 22, 1953 |
| 2,664,702 | Lloyd et al. | Jan. 5, 1954 |
| 2,692,479 | Lloyd | Oct. 26, 1954 |
| 2,711,631 | Willgoos | June 28, 1955 |
| 2,738,647 | Hill | Mar. 20, 1956 |
| 2,746,246 | Valota | May 22, 1956 |
| 2,748,567 | Dougherty | June 5, 1956 |

FOREIGN PATENTS

| | | |
|---|---|---|
| 11,726 | Great Britain | May 29, 1908 |